(12) United States Patent
Castano et al.

(10) Patent No.: US 11,235,525 B2
(45) Date of Patent: Feb. 1, 2022

(54) CONTAINER FOR AN ADDITIVE MANUFACTURING SYSTEM

(71) Applicant: HEWLETT-PACKARD DEVELOPMENT COMPANY, L.P., Houston, TX (US)

(72) Inventors: Jorge Castano, Sant Cugat del Valles (ES); Brian L. Helterline, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 308 days.

(21) Appl. No.: 16/096,423

(22) PCT Filed: Jul. 22, 2016

(86) PCT No.: PCT/US2016/043530
§ 371 (c)(1),
(2) Date: Oct. 25, 2018

(87) PCT Pub. No.: WO2018/017121
PCT Pub. Date: Jan. 25, 2018

(65) Prior Publication Data
US 2019/0143594 A1    May 16, 2019

(51) Int. Cl.
*B29C 64/259* (2017.01)
*B33Y 30/00* (2015.01)
(Continued)

(52) U.S. Cl.
CPC ............ *B29C 64/259* (2017.08); *B29C 64/25* (2017.08); *B29C 64/255* (2017.08); *B29C 64/386* (2017.08); *B29C 64/393* (2017.08); *B33Y 30/00* (2014.12); *B33Y 40/00* (2014.12); *B33Y 50/02* (2014.12)

(58) Field of Classification Search
CPC .................................................. B29C 64/259
See application file for complete search history.

(56) References Cited

U.S. PATENT DOCUMENTS 6,089,687 A    7/2000 Helterline
6,685,290 B1   2/2004 Farr et al.
(Continued)

FOREIGN PATENT DOCUMENTS

CN    105377533 A    3/2016
EP    0925936        6/1999
(Continued)

OTHER PUBLICATIONS

"Accessing the Memory of a Ink Cartridge Chip", tom'sHardware the Authority on Tech, 2013, 2 pgs< http://www.tomshardware.com/forum/67704-3-accessing-memory-cartridge-chip >.
(Continued)

*Primary Examiner* — Larry W Thrower
(74) *Attorney, Agent, or Firm* — HP Inc. Patent Department

(57) ABSTRACT

Certain examples described herein relate to replaceable production material containers for additive manufacturing systems. In an example of a replaceable production material container, an electrical storage device provides at least one production material characteristic to an element of an additive manufacturing system. In certain examples, the electrical storage device stores a range parameter for indicating a production material characteristic offset value in a plurality of production material characteristic offset values. In certain examples, the electrical storage device stores a proportion parameter for determining the at least one production material characteristic on the basis of the production material characteristic offset value.

10 Claims, 7 Drawing Sheets

(51) Int. Cl.
*B29C 64/25* (2017.01)
*B29C 64/255* (2017.01)
*B29C 64/386* (2017.01)
*B29C 64/393* (2017.01)
*B33Y 40/00* (2020.01)
*B33Y 50/02* (2015.01)

(56) References Cited

U.S. PATENT DOCUMENTS

| | | |
|---|---|---|
| 7,702,419 B2 | 4/2010 | Kinalski et al. |
| 7,769,306 B2 | 8/2010 | Able et al. |
| 8,331,807 B2 | 12/2012 | Homma et al. |
| 2005/0079128 A1 | 4/2005 | Devos et al. |
| 2010/0161267 A1 | 6/2010 | Bartel et al. |
| 2011/0157647 A1 | 6/2011 | Panshin et al. |
| 2013/0089642 A1 | 4/2013 | Lipson et al. |
| 2014/0117575 A1 | 5/2014 | Kemperle et al. |
| 2015/0089751 A1 | 4/2015 | Landa et al. |

FOREIGN PATENT DOCUMENTS

| | | |
|---|---|---|
| EP | 0941856 | 6/2004 |
| EP | 2862651 A1 | 4/2015 |
| WO | WO2004/044816 | 5/2004 |
| WO | WO 2004044816 | 5/2004 |

OTHER PUBLICATIONS

International Search Report and Written Opinion for International Application No. PCT/US2016/043530 dated May 18, 2017, 7 pages.

CONTAINER FOR AN ADDITIVE MANUFACTURING SYSTEM

BACKGROUND

Additive manufacturing systems, commonly referred to as "3D printers", use manufacturing materials and/or agents to build three-dimensional objects. Such manufacturing materials may have a number of properties and/or characteristics. Manufacturing materials may be stored in replaceable containers and provided to an additive manufacturing system prior to or during a manufacturing operation. Control data may be generated for use in such a manufacturing operation. The properties and/or characteristics of a given material may influence the generation of control data for an additive manufacturing operation involving such a material.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
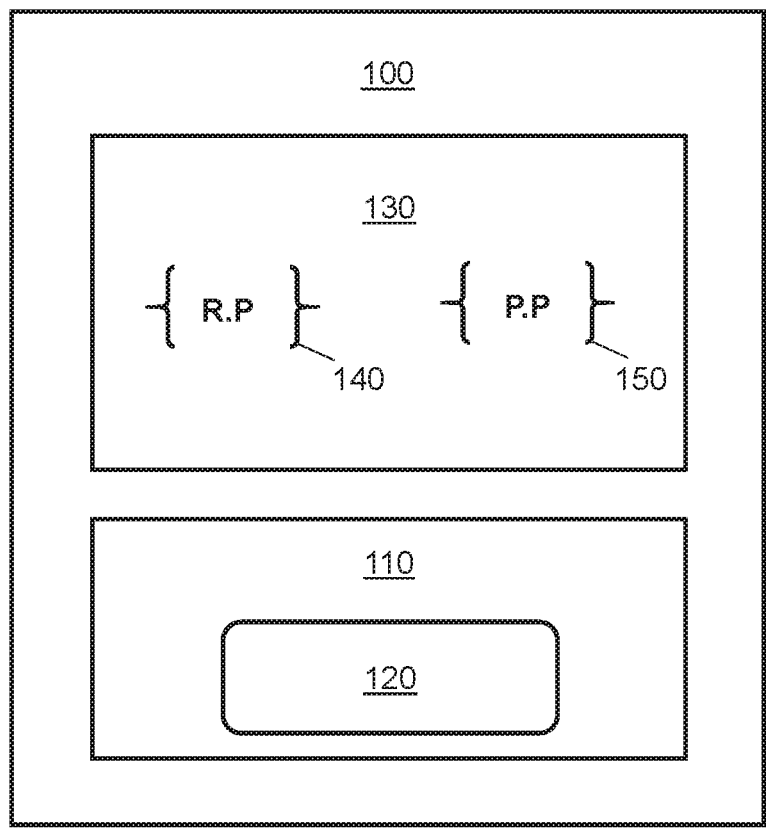
FIG. 1 is a schematic illustration showing a replaceable production material container according to an example.

FIG. 1 shows a replaceable production material container 100 according to an example. The replaceable production material container 100 may be installed in an element of an additive manufacturing system. An additive manufacturing system may comprise, for example, a 3D printer and a build material processing unit. Such an additive manufacturing system may comprise a deposit mechanism to deposit production materials to generate a three-dimensional object. In some examples, the deposit mechanism comprises a substrate supply mechanism for forming at least one powdered substrate layer and/or an agent ejection mechanism for supplying at least one liquid agent to a substrate layer. In some examples, the deposit mechanism comprises a polymer extraction mechanism for supplying heated polymers and/or liquid solutions of manufacturing material. More than one replaceable production material container may be installed in such an additive manufacturing system. The replaceable production material container 100 may comprise further components, however these are omitted in the present description for the sake of brevity.

The replaceable production material container 100 comprises a production material storage compartment 110. The production material storage compartment 110 stores production material 120 for use in additive manufacturing. In an example, production materials comprise powders for forming at least one substrate layer. In another example, production materials comprise agents for applying to a powder substrate, wherein the combination of agent and powder, following a fusing process, forms part of a manufactured three-dimensional object. In a further example, production materials comprise polymers for extraction and/or deposition. According to one example, production materials comprise printing fluids and/or inks for depositing onto a substrate. In some examples, a first type of replaceable production material container stores a first type of production material, e.g. a powder, and a second type of replaceable production material container stores a second type of production material, e.g. a liquid agent. In an example, the first type of replaceable production material container may be installed in a build material processing unit of the additive manufacturing system and the second type of replaceable production material container may be installed in a 3D printer. In another example, both the first and the second type of replaceable production material container may be installed in a 3D printer.

The production material 120 stored in the production material storage compartment 110 has a plurality of production material characteristics. The plurality of production material characteristics may comprise at least one of a density, a dust explosion class, a maximum explosion pressure, a color, a material type, a conductivity, an age, a fusing energy, a volume and a melting temperature. Other examples of production material characteristics are envisaged, some of which are described below. Any production material characteristic that is capable of description may be represented in the examples described herein. The specific characteristics of a given production material can influence how that production material may be optimally used in a given additive manufacturing operation. In some examples, at least one production material characteristic is used to generate print data for an additive manufacturing operation. Print data may be referred to as control data.

Examples of a production material characteristic include, but are not limited to, a melting characteristic such as a peak temperature of melting, an onset temperature of melting peak, an extrapolated onset temperature of melting peak and a melting enthalpy. Other examples of a production material characteristic include, but are not limited to, a recrystallization characteristic such as a peak temperature of recrystallization, an onset temperature of recrystallization peak and an extrapolated onset temperature of recrystallization peak. Examples of production material characteristics include, but are not limited to, a glass transition temperature, a Vicat softening temperature, an absorption coefficient at 1500 K color temperature, an absorption coefficient at 3000 K color temperature, a color index, an emissivity coefficient at a given melt temperature, an average particle size, e.g. within various percentiles, a loose powder density, a tapped powder density and a melt flow index. Further examples of production material characteristics include, but are not limited to, a melt flow temperature, a base material density, a solution viscosity, a base material specific heat, an indicator of compatible material families, a thermal conductivity, a specific heat, a median avalanche angle at ambient temperature, a median avalanche angle at spread temperature, a material flow function constant, a material flow function exponent, an effective angle of internal friction and a wall friction number. Additional examples of production material characteristics include, but are not limited to, a white powder transmission depth at 2750 K source, a minimum ignition temperature dust cloud, a minimum ignition temperature powder layer, a minimum explosion concentration, a minimum ignition energy dust cloud, a dust explosion class, a maximum explosion pressure, a combustion index, a maximum recycled powder mix, a number of generation cycles and an amount of water absorption.

The replaceable production material container 100 comprises an electrical storage device 130. In one example, the electrical storage device 130 is able to store data securely. In another example, the electrical storage device 130 stores data in a non-secure fashion. The electrical storage device 130 can be implemented as one or multiple computer-readable storage media. The electrical storage device 130 may comprise one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. In some examples, the electrical storage device 130 comprises a volatile memory, such as a static or dynamic random-access memory. The electrical storage device 130 provides at least one production material characteristic of the plurality of production material characteristics to an additive manufacturing system.

The electrical storage device 130 stores a range parameter 140 for indicating a production material characteristic offset value in a plurality of production material characteristic offset values. In some examples, the range parameter 140 comprises a binary number. In an example, the range parameter 140 comprises a one bit binary number, for example 0 or 1. In another example, the range parameter 140 comprises a two bit binary number, for example 00, 01, 10 or 11. In some examples, the range parameter 140 comprises a binary number containing a number of bits other than one or two.

In some examples, the plurality of production material characteristic offset values is stored in a further electrical storage device (not shown) associated with an additive manufacturing system. Each of the plurality of production material characteristic offset values may be associated with a given production material characteristic. In some examples, each of the plurality of production material characteristic offset values comprises a numerical value. In some examples, a given production material characteristic offset value in the plurality of production material characteristic offset values is associated with at least one arithmetic operation. For example, a given production material characteristic offset value may be a factor for use in an addition, subtraction, multiplication and/or division operation.

In the present example, the electrical storage device 130 stores a proportion parameter 150 for determining the at least one production material characteristic on the basis of the indicated production material characteristic offset value. In some examples, the proportion parameter 150 comprises a binary number. In an example, the proportion parameter 150 comprises a six bit binary number, for example a binary number having 64 possible values ranging from 000000 to 111111. In other examples, the proportion parameter 150 comprises an eight bit binary number, for example a binary number having 256 possible values ranging from 00000000 to 11111111. In some examples, the proportion parameter 150 comprises a binary number containing a number of bits other than six or eight.

In some examples, the range parameter 140 stored in the electrical storage device 130 is further for indicating a production material characteristic scaling value in a plurality of production material characteristic scaling values. In an example, the plurality of production material characteristic scaling values are stored in the further electrical storage device associated with the additive manufacturing system. Each of the plurality of production material characteristic scaling values may be associated with a given production material characteristic. In some examples, each of the plurality of production material characteristic scaling values comprises a numerical value. In some examples, a given production material characteristic scaling value in the plurality of production material characteristic scaling values is associated with at least one arithmetic operation. For example, a given production material characteristic scaling value may be a factor for use in an addition, subtraction, multiplication and/or division operation.

In some examples, the proportion parameter 150 is for determining the at least one production material characteristic on the basis of the indicated production material characteristic offset value and/or the indicated production material characteristic scaling value.

In some examples, the electrical storage device 130 stores a plurality of range parameters. For example, the electrical storage device 130 may store a first range parameter and a second range parameter. The first range parameter may be associated with a first production material characteristic, e.g. a material density. The second range parameter may be associated with a second production material characteristic, e.g. a material dust explosion class representing a combination of a maximum explosion pressure and a rate of pressure rise. In an example, a dust explosion class is a metric of a rapid combustion of small particles dispersed in air. Combustion can occur under some temperature conditions if the material of the particles is combustible and if the particles are suspended in an oxidizing gaseous medium such as air. The severity of such a combustion may be represented by a dust explosion class characteristic. In some examples, the first range parameter associated with the first production material characteristic is for indicating a first production material characteristic offset value in a first plurality of production material characteristic offset values. The second range parameter associated with the second production material characteristic may be for indicating a second production material characteristic offset value in a second plurality of production material characteristic offset values. In an example, the first plurality of production material characteristic offset values and the second plurality of production material characteristic offset values are stored in a further electrical storage device associated with an additive manufacturing system.

In some examples, the electrical storage device 130 associated with the replaceable production material container 100 stores a plurality of proportion parameters. For example, a first proportion parameter and a second proportion parameter may be stored by the electrical storage device 130. In some examples, the first proportion parameter is for determining a first production material characteristic. In an example, the first production material characteristic is determined on the basis of an identified first production material characteristic offset value. In some examples, the second proportion parameter is for determining a second production material characteristic. In an example, the second production material characteristic is determined on the basis of an identified second production material characteristic offset value. The first proportion parameter and the second proportion parameter may each comprise a binary number. In some examples, the first proportion parameter comprises a binary number containing a different number of bits compared with the binary number of the second proportion parameter. For example, the first proportion parameter may comprise an 8 bit binary number and the second proportion parameter may comprise a 6 bit binary number. In some examples, the first and the second proportion parameters may each comprise binary numbers containing a number of bits other than 6 or 8. The number of bits included in a given proportion parameter may be selected to enable a number of discrete characteristic values to be represented in a given range of characteristic values. In some examples, the number of bits in a given proportion parameter is selected to minimize an amount of data stored on the electrical storage device 130 while providing a suitable number of discrete values to represent a given production material characteristic.

In the following example, provided for illustrative purposes only, two production material characteristics are provided. In this example, the first production material characteristic is density, defined in units of grams/cm$^3$. In this example, a one bit binary range parameter is used, providing two possible range parameter values of 0 and 1. Each of the possible range parameter values is associated with a production material density offset value and a production material density scaling value. The offset value and the scaling value associated with each of the possible range parameter values of the present example are shown in Table 1. In this example, an eight bit binary proportion parameter is used, providing $2^8=256$ possible proportion parameter values, ranging from a minimum of 00000000=0 to a maximum of 11111111=255. For a given range parameter value, the proportion parameter value may be multiplied by the corresponding scaling value and added to the corresponding offset value to obtain a production material density value.

TABLE 1

| Range parameter | Offset Value | Scaling value | Proportion 00000000 | Proportion 11111111 |
|---|---|---|---|---|
| 0 | +0 | x0.01 | 0.00 | 2.55 |
| 1 | +2.5 | x0.1 | 2.5 | 28 |

By using the one bit binary range parameter, two production material density ranges may be defined. The production material density offset values may be used to separate the two ranges. The number of bits in the proportion parameter may define the number of possible discrete values within each range, e.g. 256. Production material scaling values may be used to affect the resolution of the possible values within each range. In this example, a first production material density range has a minimum of 0.00 grams/cm$^3$ and a maximum of 2.55 grams/cm$^3$, with a resolution of 0.01 grams/cm$^3$. The first production material density range may cover the densities of many fluids. It may be desirable to report the density values of production materials in the first range with a relatively high resolution. A second production material density range has a minimum of 2.5 grams/cm$^3$ and a maximum of 28 grams/cm$^3$, with a resolution of 0.1 grams/cm$^3$. The second production material density range may cover the densities of many ceramics and chemical elements. It may be desirable to report the density values of production materials in the second range with a relatively low resolution. A relatively low resolution may be desirable in order to increase the breadth of the reportable range without increasing the number of bits of the proportion parameter.

In this example, the second production material characteristic is a dust explosion class, representing a maximum explosion pressure and rate of pressure rise, defined in units of bar-m/s. Similarly to the density characteristic described above, a one bit binary range parameter is used, providing two possible range parameter values of 0 and 1. Each of the possible range parameter values is associated with a production material explosion class offset value and a production material explosion class scaling value. The offset values and scaling values associated with each of the possible range parameter values of the present example are shown in Table 2. In this example, a six bit binary proportion parameter is used, providing $2^6=64$ possible proportion parameter values, ranging from a minimum of 000000=0 to a maximum of 111111=63. For a given range parameter value, the proportion parameter value may be multiplied by the corresponding scaling value and added to the corresponding offset value to obtain a production material explosion class value.

TABLE 2

| Range parameter | Offset Value | Scaling value | Proportion 000000 | Proportion 111111 |
|---|---|---|---|---|
| 0 | +126 | x0.5 | 126.0 | 157.5 |
| 1 | +157 | x1 | 157 | 220 |

In the present example, two production material explosion class ranges are defined by the two range parameter values. In this example, a first production material explosion class range has a minimum of 126.0 bar-m/s and a maximum of 157.5 bar-m/s, with a resolution of 0.5 bar-m/s. A second production material explosion class range has a minimum of 157 bar-m/s and a maximum of 220 bar-m/s, with a resolution of 1 bar-m/s. Production materials used by additive manufacturing systems may have dust explosion classes in the range between 126 bar-m/s and 220 bar-m/s. Therefore, the offset values may be selected such that the two production material explosion class ranges cover the explosion class values of used production materials, but do not cover explosion class values that are not associated with any known and/or used production materials. For example, explosion class values less than 126 bar-m/s and/or greater than 220 bar-m/s may not be physically possible, safe and/or practical.

In some examples, production material characteristic offset values and/or production material characteristic scaling values are selected in order to describe a wide variety of different production materials with greater accuracy. A given range (associated with a given range parameter value) may be dependent on an offset value, a scaling value and the number of bits in the proportion parameter. The offset value may indicate a minimum value of the given range. The scaling value may indicate a resolution, e.g. a separation, of possible discrete values in the given range. The number of bits in the proportion parameter may indicate a number of possible discrete values in the given range, each possible value being separated by the resolution indicated by the scaling value.

In some examples, offset values are selected such that different ranges are contiguous, e.g. non-overlapping. In some examples, offset values are selected such that different ranges are non-contiguous, e.g. separated by a defined amount. In some examples, offset values are selected such that the resolution of possible values in a given range may be increased. Without an offset value, a characteristic value that is close to the upper bound value of a given range may not be accurately reported, due to a relatively low resolution. In order to increase the resolution in this range, the scaling value could be reduced. However, for a given number of bits in the proportion parameter, a reduction in the scaling value could result in a reduction of the upper bound value of the range. This could potentially leave the characteristic value outside the reportable range. Therefore, an offset value may be applied, in order to increase the lower bound value of the range. Consequently, the resolution within the range can be increased, improving the accuracy of the reported characteristic value.

In some examples, scaling values are selected to influence the breadth of the ranges and/or the resolution of possible values within a given range. For example, selecting a smaller scaling value may result in a higher resolution of possible values within a given range. For a given number of bits in the proportion parameter, a smaller scaling value may also result in a narrower range of possible values. In some examples, the number of bits of the proportion parameter is selected to influence the breadth of the ranges. For example, an eight bit proportion parameter may result in a wider range than that resulting from a six bit proportion parameter, if a same scaling value were used in each case. In some examples, an eight bit proportion parameter results in an equally wide or less wide range than that resulting from a six bit proportion parameter, if the scaling value selected for the six bit proportion parameter is sufficiently greater than the scaling value selected for the eight bit proportion parameter.

Figure 2:
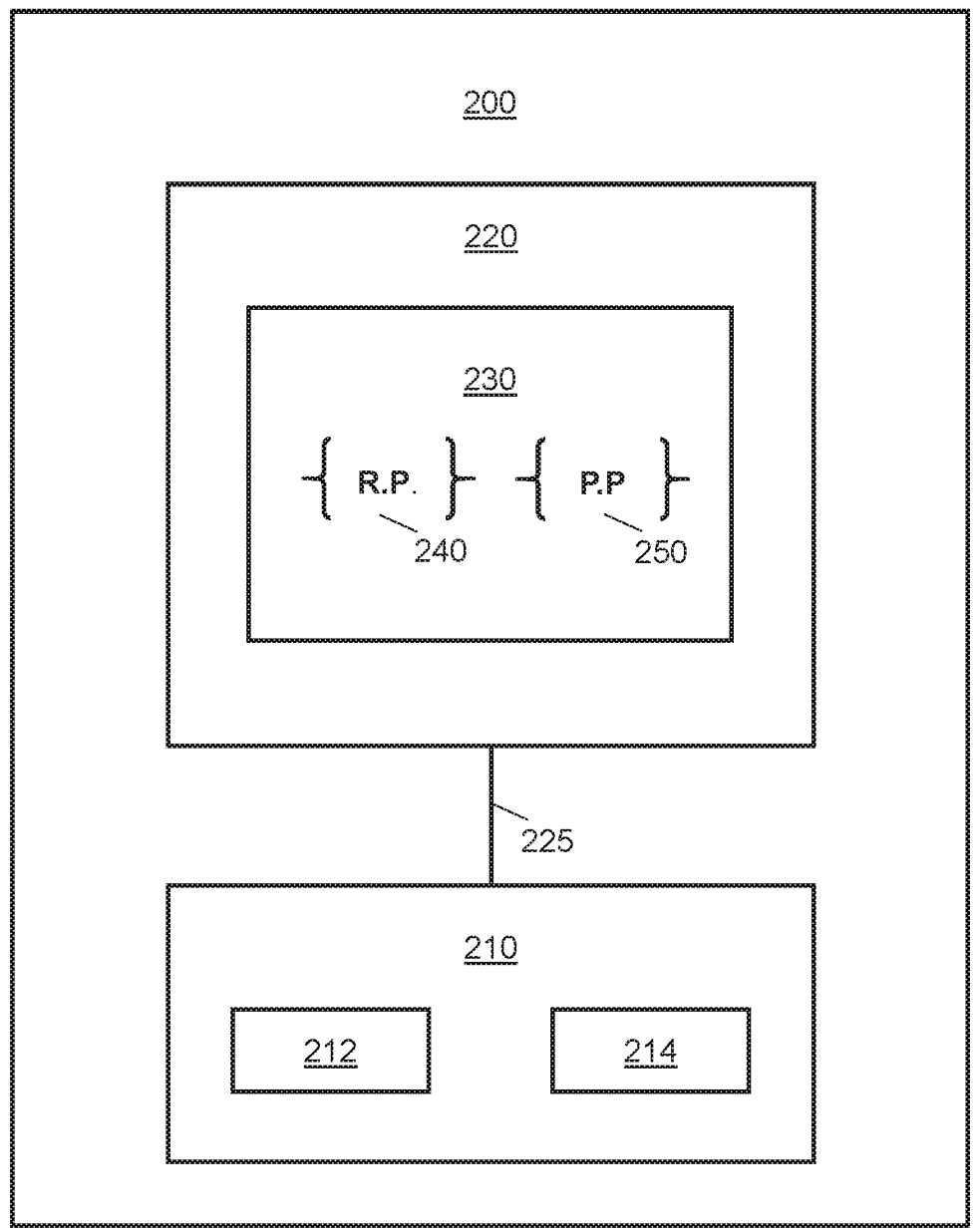
FIG. 2 is a schematic illustration showing an additive manufacturing system according to an example.

FIG. 2 shows an additive manufacturing system 200 according to an example. The additive manufacturing system 200 comprises an object manufacturing portion 210 for manufacturing a three-dimensional object using at least one manufacturing material. The object manufacturing portion 210 comprises an electrical storage device 212, e.g. a memory, and at least one processor 214.

The additive manufacturing system 200 comprises a replaceable manufacturing material container 220. The replaceable manufacturing material container 220 may be installed and/or removed from the additive manufacturing system 200. In some examples, when installed in the additive manufacturing system 200, the replaceable manufacturing material container 220 provides manufacturing material to the object manufacturing portion 210. The manufacturing material may be provided to the object manufacturing portion 210 prior to and/or during an object manufacturing operation. When installed in the additive manufacturing system 200, the replaceable manufacturing material container 220 is coupled to the object manufacturing portion 210 via at least one connection 225. In an example, the at least one connection 225 comprises an electrical connection. In some examples, the at least one connection 225 facilitates communication of data between the replaceable manufacturing material container 220 and the object manufacturing portion 210.

In the present example, the replaceable manufacturing material container 220 comprises an electrical storage device 230 for providing at least one manufacturing material characteristic to the object manufacturing portion 210. The electrical storage device 230 stores a range parameter 240 and a proportion parameter 250. The range parameter 240 indicates a manufacturing material characteristic offset value in a plurality of manufacturing material characteristic offset values. The proportion parameter 250 indicates a difference between the at least one manufacturing material characteristic and the indicated manufacturing material characteristic offset value.

The object manufacturing portion 210 obtains the range parameter 240 and the proportion parameter 250 from the electrical storage device 230 and determines the at least one manufacturing material characteristic on the basis of the proportion parameter 250 and the indicated manufacturing material offset value. In some examples, the object manufacturing portion 210 determines the at least one manufacturing material characteristic by adding the indicated manufacturing material offset value to the proportion parameter 250.

In some examples, the range parameter 240 indicates a manufacturing material characteristic scaling factor in a plurality of manufacturing material characteristic scaling factors. In an example, the object manufacturing portion 210 determines the at least one manufacturing material characteristic by applying the indicated manufacturing material characteristic offset value to a manufacturing material characteristic scaled proportion value. In some examples, the manufacturing material characteristic scaled proportion value is obtained by multiplying the proportion parameter 250 by the indicated manufacturing material characteristic scaling factor.

Figure 3:
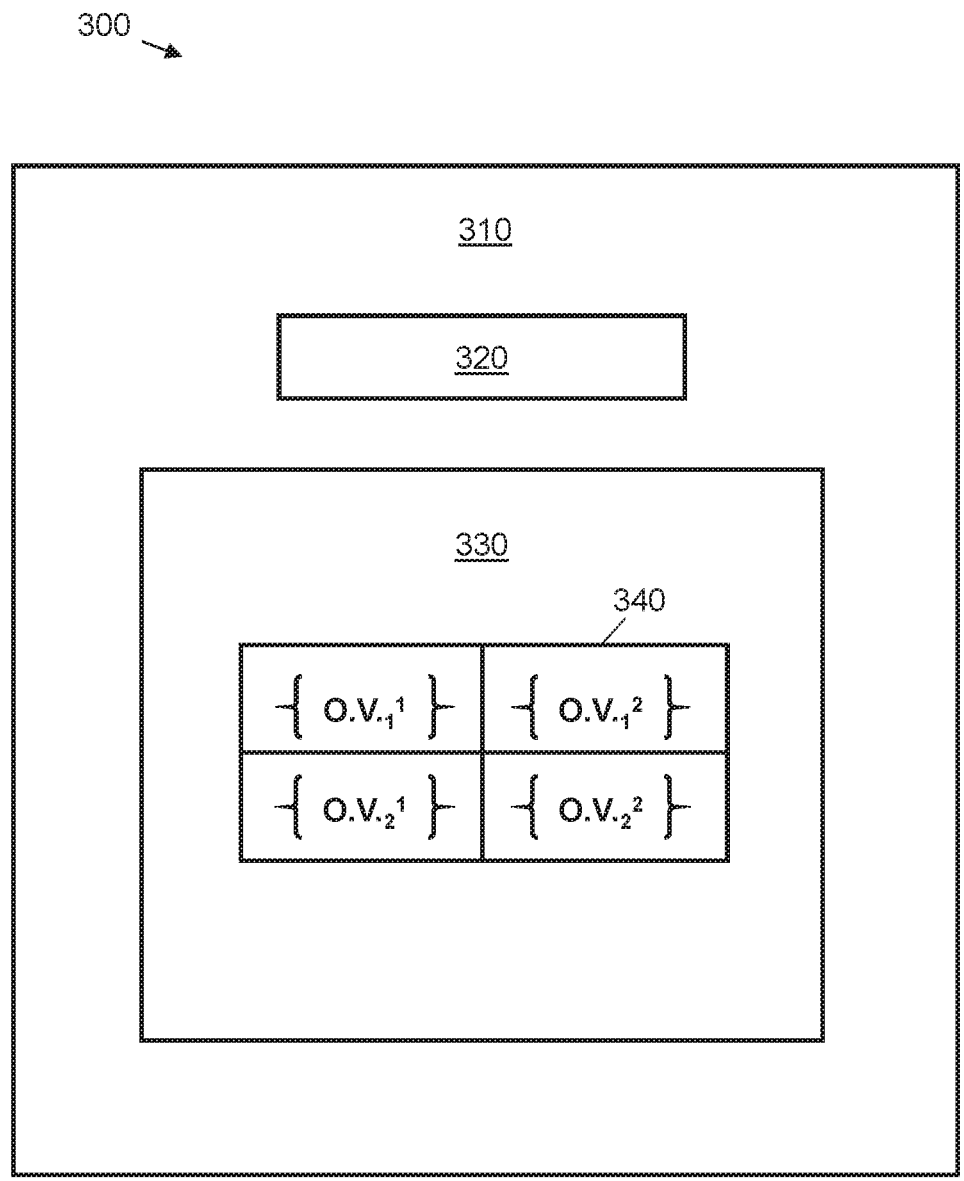
FIG. 3 is a schematic illustration showing an additive manufacturing system according to an example.

FIG. 3 shows an element of an additive manufacturing system 300 according to an example. In some examples, the element of the additive manufacturing system 300 comprises a material processing unit. The additive manufacturing system 300 comprises an object manufacturing portion 310 for manufacturing a three-dimensional object using at least one manufacturing material. The object manufacturing portion 310 comprises at least one processor 320 and an electrical storage device 330. The electrical storage device 330 can be implemented as one or multiple computer-readable storage media. The electrical storage device 330 may comprise one or more different forms of memory.

The electrical storage device 330 comprises a plurality of manufacturing material characteristic offset values. The plurality of manufacturing material characteristic offset values are arranged in a look-up table 340. In some examples, the plurality of manufacturing material characteristic offset values is arranged as a first plurality of manufacturing material characteristic offset values and a second plurality of manufacturing material characteristic offset values. In the present example, the first plurality of manufacturing material characteristic offset values is arranged in a first row of the look-up table 340 and the second plurality of manufacturing material characteristic offset values is arranged in a second row of the look-up table 340. In other examples, each value in a given plurality of manufacturing material characteristic offset values is arranged in a separate row of an associated look-up table. In the present example, the first plurality of manufacturing material characteristic offset values is associated with a first manufacturing material characteristic and the second plurality of manufacturing material characteristic offset values is associated with a second manufacturing material characteristic. In other words, manufacturing material characteristic offset values $O.V._1{}^1$ and $O.V._1{}^2$ are associated with a first manufacturing material characteristic, e.g.

density, and manufacturing material characteristic offset values $O.V._2^1$ and $O.V._2^2$ are associated with a second manufacturing material characteristic, e.g. conductivity. In some examples, the look-up table 340 comprises more than two pluralities of manufacturing material characteristic offset values, each plurality of manufacturing material characteristic offset values being associated with a given manufacturing material characteristic.

In some examples, each plurality of manufacturing material characteristic offset values is associated with a range parameter stored on a storage device coupled to a manufacturing material container, e.g. range parameter 240. Different pluralities of manufacturing material characteristic offset values may be associated with different range parameters. In some examples, each manufacturing material characteristic offset value in a given plurality of manufacturing material characteristic offset values is associated with a particular value of the corresponding range parameter. In the present example, manufacturing material characteristic offset value $O.V._1^1$ is associated with a first value of a first range parameter, $O.V._1^2$ is associated with a second value of the first range parameter, $O.V._2^1$ is associated with a first value of a second range parameter, and $O.V._2^2$ is associated with a second value of the second range parameter.

In the present example, the object manufacturing portion 310 obtains a first and a second range parameter from an electrical storage device associated with a manufacturing material container. Using the obtained first range parameter, the object manufacturing portion 310 may select a manufacturing material characteristic offset value from the first plurality of manufacturing material characteristic offset values, $O.V._1^1$ and $O.V._1^2$. In some examples, the first plurality of manufacturing material characteristic offset values is associated with a first manufacturing material characteristic. The manufacturing material characteristic offset value may be selected based on the value of the obtained first range parameter. For example, the first range parameter may comprise a one bit binary number having possible values of 0 and 1. If the value of the obtained first range parameter is 0, $O.V._1^1$ is selected. If the value of the obtained first range parameter is 1, $O.V._1^2$ is selected. In some examples, the object manufacturing portion 310 selects a manufacturing material characteristic offset value from the second plurality of manufacturing material characteristic offset values, $O.V._2^1$ and $O.V._2^2$, on the basis of the obtained second range parameter in a similar fashion as above. The second plurality of manufacturing material characteristic offset values may, according to some examples, be associated with a second manufacturing material characteristic.

Figure 4:
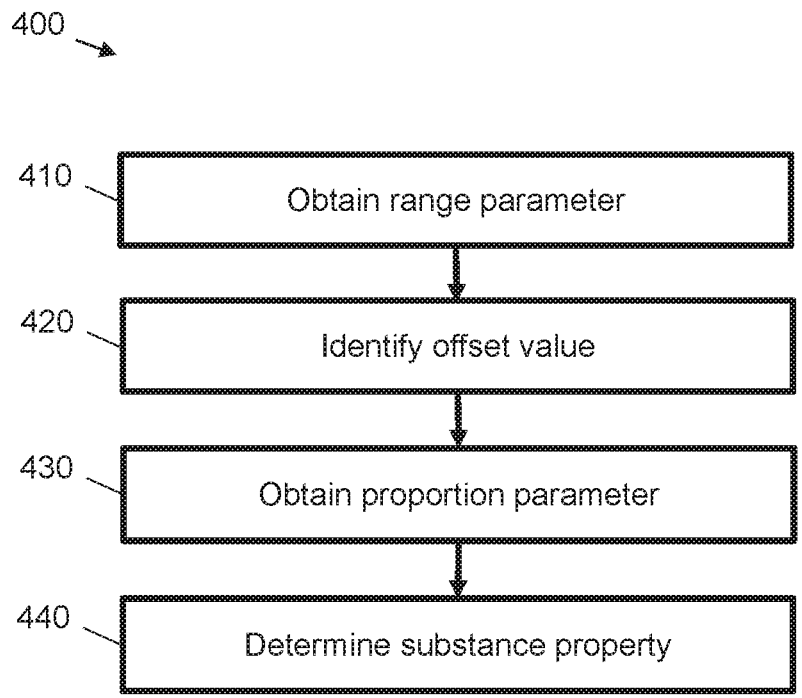
FIG. 4 is a flow diagram showing a method of determining at least one printing substance property according to an example.

FIG. 4 shows a method 400 of determining at least one printing substance property according to an example. The at least one printing substance property is associated with a printing substance having a plurality of printing substance properties. The printing substance is usable in an additive manufacturing operation. The additive manufacturing operation may be performed by an additive manufacturing system such as additive manufacturing system 200 as previously described. The printing substance may be stored in a replaceable container such as replaceable production material container 100 as previously described. In some examples the method 400 is performed by a computer control system arranged in the additive manufacturing system.

At block 410, a range parameter is obtained from an electrical storage device associated with a printing substance container storing the printing substance. In some examples, the range parameter comprises a one or two bit binary value. In other examples, the range parameter comprises a binary value containing a number of bits greater than two.

At block 420, a printing substance property offset value in a plurality of printing substance property offset values is identified. The printing substance property offset value is identified on the basis of the range parameter obtained at block 410.

At block 430, a proportion parameter is obtained from the electrical storage device. In some examples, the proportion parameter comprises a six or eight bit binary value.

At block 440, the at least one printing substance property is determined. The at least one printing substance property is determined on the basis of the printing substance property offset value identified at block 420 and on the basis of the proportion parameter obtained at block 430. In some examples, the at least one printing substance property is determined by adding the identified printing substance property offset value to the obtained proportion parameter.

Figure 5:
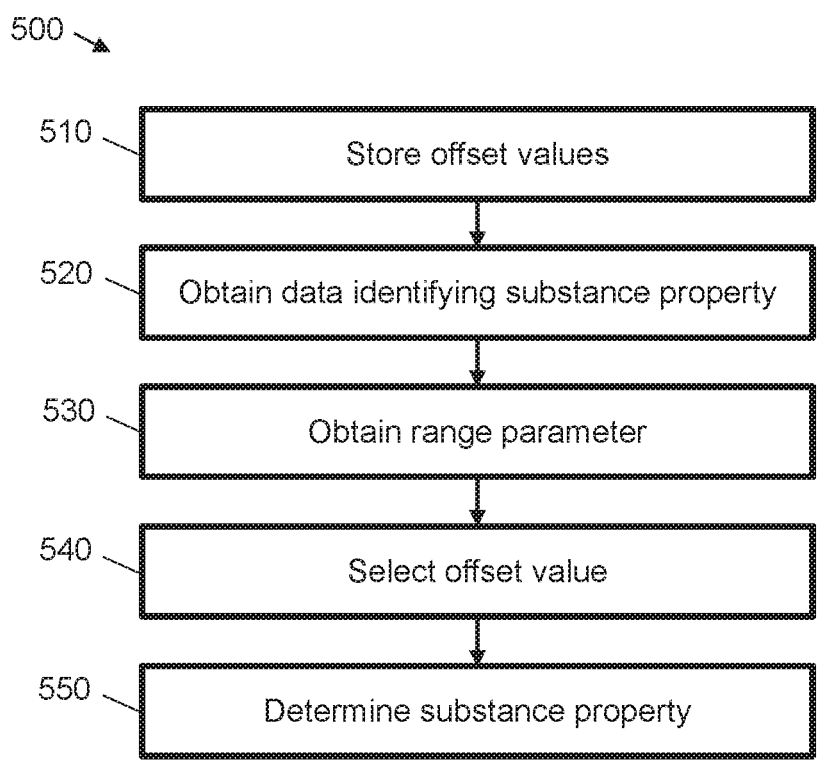
FIG. 5 is a flow diagram showing a method of determining at least one printing substance property according to an example.

FIG. 5 shows a method 500 of determining at least one printing substance property associated with a printing substance according to an example. The printing substance may be usable in an additive manufacturing operation performed by an additive manufacturing system such as additive manufacturing system 200 as previously described. The printing substance is contained in a printing substance container having an associated electrical storage device. In some examples, the method 500 is performed by a computer control system arranged in the additive manufacturing system.

At block 510, a plurality of printing substance property offset values are stored on a further electrical storage device associated with the additive manufacturing system. In some examples, the plurality of printing substance property offset values is stored in at least one look-up table on the further electrical storage device. In one example, the plurality of printing substance property offset values comprises a first plurality of printing substance property offset values and a second plurality of printing substance property offset values. The first plurality of printing substance property offset values may be associated with a first printing substance property. The second plurality of printing substance property offset values may be associated with a second printing substance property. The first and the second pluralities of printing substance property offset values may be stored in a same look-up table or in different look-up tables. In some examples, the further electrical storage device comprises a non-volatile memory incorporated in the additive manufacturing system. In some examples, the further electrical storage device forms part of a computer control system arranged in the additive manufacturing system. The computer control system may control printing operations performed by the additive manufacturing system.

At block 520, data identifying a printing substance property is obtained from the electrical storage device associated with the printing substance container. In an example, the data identifying a printing substance property comprises a printing substance property indicator. In some examples, data identifying a plurality of printing substance properties is obtained from the electrical storage device associated with the printing substance container. The data identifying the plurality of printing substance properties may comprise a plurality of printing substance property identifiers.

At block 530, a range parameter is obtained from the electrical storage device associated with the printing substance container. In some examples, a plurality of range parameters is obtained from the electrical storage device associated with the printing substance container, each range parameter being associated with a different printing substance property. In an example, a first range parameter is obtained, the first range parameter being associated with a first printing substance property. In this example, a second range parameter is additionally obtained, the second range parameter being associated with a second printing substance property.

At block 540, a printing substance property offset value is selected from the stored plurality of printing substance property offset values. The printing substance property offset value is selected on the basis of the range parameter obtained at block 530. In some examples, the printing substance property offset value is selected further on the basis of the data identifying the printing substance property obtained at block 520. In some examples, the obtained range parameter and/or the obtained data identifying the printing substance property facilitates the selection of a printing substance property offset value from a look-up table stored on the further electrical storage device associated with the additive manufacturing system. In some examples, a first printing substance property offset value is selected from a stored first plurality of printing substance property offset values, the first plurality of printing substance property offset values being associated with a first printing substance property. In some examples, a second printing substance property offset value is selected from a stored second plurality of printing substance property offset values, the second plurality of printing substance property offset values being associated with a second printing substance property.

At block 550, a printing substance property is determined on the basis of the printing substance property offset value selected at block 540 and on the basis of a proportion parameter obtained from the electrical storage device associated with the printing substance container. In some examples, a plurality of proportion parameters are obtained from the electrical storage device associated with the printing substance container. In an example, each proportion parameter is associated with a different printing substance property. A first printing substance property may be determined on the basis of a first proportion parameter obtained from the electrical device. In some examples, the first printing substance property is determined further on the basis of a first identified printing substance property offset value. A second printing substance property may be determined on the basis of a second proportion parameter obtained from the electrical device. In some examples, the second printing substance property is determined further on the basis of a second identified printing substance property offset value.

Figure 6:
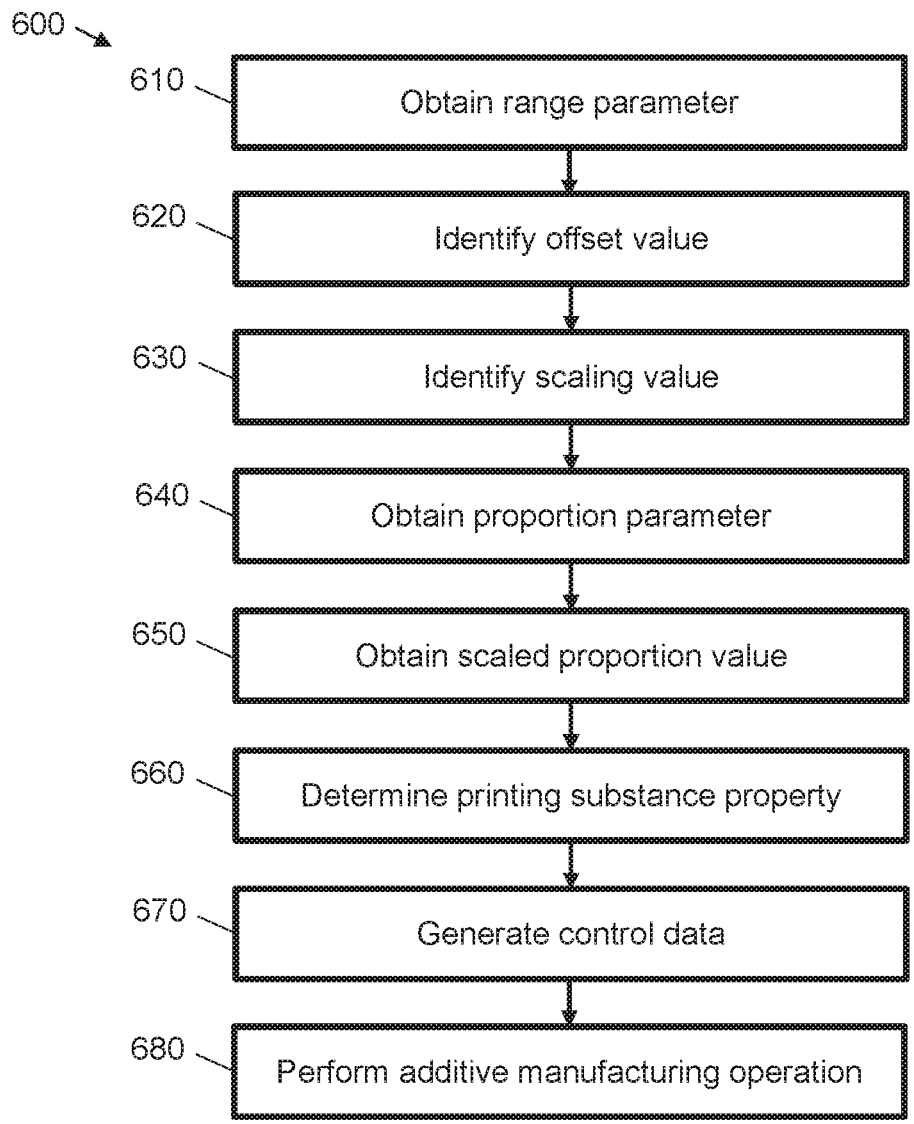
FIG. 6 is a flow diagram showing a method of operating an additive manufacturing system according to an example.

FIG. 6 shows a method 600 of operating an additive manufacturing system according to an example. The additive manufacturing system may be capable of performing additive manufacturing operations to manufacture three-dimensional objects using at least one printing substance. The at least one printing substance is stored in at least one printing substance container having an associated electrical storage device. The additive manufacturing system may comprise additive manufacturing systems 200 or 300 as previously described. In some examples, the method 600 is performed by a computer control system arranged in the additive manufacturing system.

At block 610, a range parameter is obtained from the electrical storage device associated with the printing substance container.

At block 620, a printing substance property offset value in a plurality of printing substance property offset values is identified on the basis of the range parameter obtained at block 610.

At block 630, a printing substance property scaling value in a plurality of printing substance property scaling values is identified on the basis of the range parameter obtained at block 610.

At block 640, a proportion parameter is obtained from the electrical storage device associated with the printing substance container.

At block 650, a scaled proportion value is obtained by multiplying the proportion parameter obtained at block 640 by the printing substance property scaling value identified at block 630.

At block 660, at least one printing substance property is determined by applying the printing substance property offset value identified at block 620 to the scaled proportion value obtained at block 650. The at least one printing substance property is associated with the printing substance stored in the printing substance container.

At block 670, control data for an additive manufacturing operation is generated. The control data is generated on the basis of the at least one printing substance property determined at block 660. The control data may comprise instructions and/or data relating to deposition, extraction, fusing, binding, curing, cooling and/or any other manufacturing process involving the printing substance.

At block 680, an additive manufacturing operation is performed using the printing substance and the control data generated at block 670. In some examples, the additive manufacturing operation involves the manufacture of a three-dimensional object.

Figure 7:
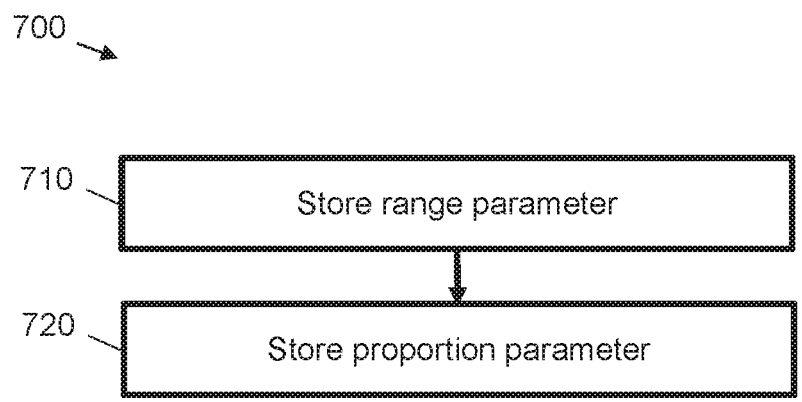
FIG. 7 is a flow diagram showing a method of storing at least one printing substance property according to an example.

FIG. 7 shows a method of storing at least one printing substance property of a plurality of printing substance properties in an electrical storage device according to an example. The electrical storage device is associated with a printing substance container. The printing substance container is for storing a printing substance useable in an additive manufacturing operation. The printing substance is associated with the plurality of printing substance properties. In some examples, the at least one printing substance property is for use in generating control data for an additive manufacturing operation.

At block 710, a range parameter is stored in the electrical storage device, the range parameter identifying a printing substance property offset value in a plurality of printing substance property offset values. In some examples, the range parameter is a one or two bit binary value. In some examples, the range parameter is determined on the basis of at least one printing substance property. The range parameter may, for example, be calculated based on a printing substance identifier and/or a printing substance property identifier. In some examples, the range parameter is received from at least one further entity. In some examples, the range parameter identifies a printing substance property scaling value in a plurality of printing substance property scaling values. In some examples, a first range parameter and a second range parameter are stored, the first range parameter being associated with a first printing substance property and the second range parameter being associated with a second printing substance property. The first range parameter identifies a first printing substance property offset value in a first plurality of printing substance property offset values. The second range parameter identifies a second printing substance property offset value in a second plurality of printing substance property offset values.

At block 720, a proportion parameter is stored in the electrical storage device, the proportion parameter being for determining the at least one printing substance property on the basis of the identified printing substance property offset value. In some examples, the proportion parameter is a six or eight bit binary value. In some examples, the proportion parameter is determined on the basis of at least one printing substance property. The proportion parameter may, for example, be derived based on a printing substance identifier and/or a printing substance property identifier. In some examples, the proportion parameter is received from at least one further entity. In some examples, the proportion parameter is for determining the at least one printing substance property further on the basis of the identified printing substance property scaling value. In some examples, a first proportion parameter and a second proportion parameter are stored, the first proportion parameter being for determining a first printing substance property on the basis of an identified first printing substance property offset value and the second proportion parameter being for determining a second printing substance property on the basis of an identified second printing substance property offset value.

Figure 8:
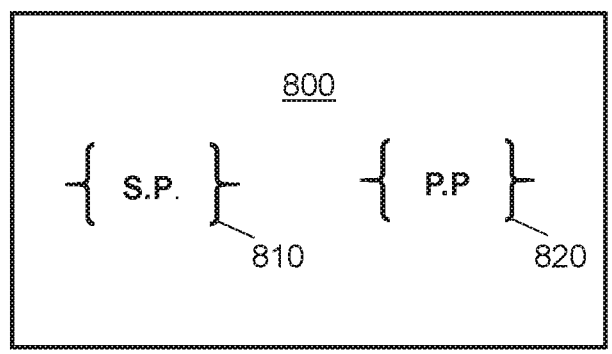
FIG. 8 is a schematic illustration showing an electrical storage device according to an example.

FIG. 8 shows an electrical storage device 800 for a manufacturing substance container according to an example. The manufacturing substance container is for storing a manufacturing substance for use in an additive manufacturing operation. The electrical storage device 800 stores a scaling parameter 810 identifying a manufacturing substance characteristic offset value in a plurality of manufacturing substance characteristic offset values. The electrical storage device 800 further stores a proportion parameter 820 for determining at least one manufacturing substance characteristic of a plurality of manufacturing substance characteristics by applying the identified manufacturing substance characteristic offset value to the determined proportion parameter. In some examples, the at least one manufacturing substance characteristic is for use in generating print data for an additive manufacturing operation.

The electrical storage device 800 can be implemented as one or multiple computer-readable storage media. The electrical storage device 800 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Certain examples described herein enable a reduction of data storage in the memory of an additive manufacturing system. By storing data usable to determine a plurality of characteristics relating to a manufacturing material on an electrical storage device associated with a replaceable manufacturing material container, the additive manufacturing system itself may be unburdened from storing such characteristics. As the number of possible manufacturing materials used by the additive manufacturing system increases, data storage in the additive manufacturing system may be further improved.

Certain examples enable new and/or previously unused materials to be introduced to an additive manufacturing system without changing firmware or software used by the additive manufacturing system. The framework of encoding material characteristics using range parameters and proportion parameters on an electrical storage device associated with a replaceable material container may be maintained despite the introduction of new materials and/or new material characteristics. Therefore, a relatively large number of materials and material characteristics may be accommodated.

Certain examples enable descriptors of a plurality of manufacturing material characteristics to be determined and used to generate print data for an additive manufacturing operation. Various print parameters and/or print instructions used in the manufacture of a three-dimensional object may be dependent on the physical and/or chemical properties of the manufacturing materials used. Consequently, providing such properties to the additive manufacturing system, with improved accuracy, may enable the additive manufacturing system to manufacture a higher quality three-dimensional object.

Certain examples provide an efficient storage mechanism for an electrical device associated with a replaceable manufacturing material container. The use of a range parameter to indicate a manufacturing material characteristic offset value enables a reduction in the amount of data that needs to be stored on the electrical device. By reducing the size of the stored data for determining each material characteristic, a greater number of describable material characteristics may be included without increasing the overall storage capacity of the electrical storage device.

Certain examples enable a resolution of possible discrete characteristic values in a given range to be increased without increasing an amount of data stored on the electrical storage device of the production material container. Production material characteristic offset values may be employed to narrow a given range of possible characteristic values, thereby increasing the accuracy with which such characteristic values may be reported.

Certain examples enable characteristics of a wide variety of printing materials to be described with relatively high accuracy. By encoding material properties using material property offset values and/or material property scaling values, one or more ranges of possible material property values may be provided which optimally cover the inherent property values of a relatively large number of materials. Different ranges and/or range portions may be provided with different reporting resolutions. For example, a first range covering a first set of materials may be provided with a higher reporting resolution than a second range covering a second set of materials. The first set of materials may be more numerous than the second set of materials.

Certain examples described herein relate to a replaceable production material container for an additive manufacturing system, wherein an electrical storage device associated with the replaceable production material container provides production material characteristics to the additive manufacturing system. In some examples, the electrical storage device associated with the replaceable production material container provides production material characteristics to a system other than an additive manufacturing system. For example, the electrical storage device associated with the replaceable production material container may be able to communicate with and provide production material characteristics to a production material filling apparatus, a printer servicing apparatus and/or a production material test apparatus.

The preceding description has been presented to illustrate and describe examples of the principles described. This description is not intended to be exhaustive or to limit these principles to any precise form disclosed. Many modifications and variations are possible in light of the above teaching.

What is claimed is:

1. A replaceable production material container for an additive manufacturing system, comprising:
   a compartment storing a production material for use in additive manufacturing, the production material having a production material characteristic; and
   an electrical storage device storing:
   a range parameter associated with the production material characteristic, the range parameter indicating an offset value defining a starting value for a range of discrete values for the production material characteristic and indicating a scaling value defining an increment of each discrete value in the range; and
   a proportion parameter defining a number of possible discrete values in the range and indicating which of the possible discrete values in the range corresponds to a value for the production material characteristic.

2. The replaceable production material container of claim 1, wherein the production material characteristic comprises: a density, a dust explosion class, a maximum explosion pressure, a color, a type, a conductivity, an age, a fusing energy or a melting temperature.

3. The replaceable production material container of claim 1,
   wherein the range parameter is a one bit binary value indicating one of two possible combinations of offset and scaling values, and
   wherein the proportion parameter is an eight bit binary value defining two hundred fifty six possible discrete values in the range.

4. The replaceable production material container of claim 1, wherein the value for the production material characteristic is for use in generating print data for an additive manufacturing operation.

5. An electrical storage device for a production material container storing a production material for use in an additive manufacturing operation, the production material having a characteristic, and the electrical storage device storing:
   a range parameter associated with the production material characteristic, the range parameter indicating an offset value defining a starting value for a range of discrete values for the production material characteristic and indicating a scaling value defining an increment of each discrete value in the range; and
   a proportion parameter defining a number of possible discrete values in the range and indicating which of the possible discrete values in the range corresponds to a value for the production material characteristic.

6. The electrical storage device of claim 5, wherein the production material characteristic comprises: a density, a dust explosion class, a maximum explosion pressure, a color, a type, a conductivity, an age, a fusing energy or a melting temperature.

7. The electrical storage device of claim 5,
   wherein the range parameter is a one bit binary value indicating one of two possible combinations of offset and scaling values, and
   wherein the proportion parameter is an eight bit binary value defining two hundred fifty six possible discrete values in the range.

8. An electrical storage device for a production material container storing a production material for use in an additive manufacturing operation, the production material having a first characteristic and a second characteristic, the electrical storage device storing:
   a first range parameter associated with the first production material characteristic, the first range parameter indicating an offset value defining a starting value for a first range of discrete values for the first production material characteristic and indicating a scaling value defining an increment of each discrete value in the first range;
   a first proportion parameter defining a number of possible discrete values in the first range and indicating which of the possible discrete values in the first range corresponds to a value for the production material characteristic;
   a second range parameter associated with the second production material characteristic, the second range parameter indicating an offset value defining a starting value for a second range of discrete values for the second production material characteristic and indicating a scaling value defining an increment of each discrete value in the second range; and
   a second proportion parameter defining a number of possible discrete values in the second range and indicating which of the possible discrete values in the second range corresponds to a value for the production material characteristic.

9. The electrical storage device of claim 8, wherein:
   the first production material characteristic comprises one of a density, a dust explosion class, a maximum explosion pressure, a color, a type, a conductivity, an age, a fusing energy and a melting temperature; and
   the second production material characteristic comprises another one of a density, a dust explosion class, a maximum explosion pressure, a color, a type, a conductivity, an age, a fusing energy and a melting temperature.

10. The electrical storage device of claim 9, wherein:
    the first range parameter is a one bit binary value indicating one of two possible combinations of offset and scaling values,
    the second range parameter is a one bit binary value indicating another one of two possible combinations of offset and scaling values;
    the first proportion parameter is an eight bit binary value defining two hundred fifty six possible discrete values in the first range; and
    the second proportion parameter is a six bit binary value defining sixty four possible discrete values in the second range.

* * * * *